United States Patent
Reymondet et al.

[11] Patent Number: 5,805,263
[45] Date of Patent: Sep. 8, 1998

[54] LENS BLANKS, PROCESS OF MANUFACTURE THEREFOR AND EYEWEAR INCORPORATING LENSES MADE THEREFROM

[75] Inventors: Bernard Reymondet; Etienne Billard, both of Saint Claude, France

[73] Assignee: Christian Dalloz S.A., Saint-Claude, France

[21] Appl. No.: 730,765

[22] Filed: Oct. 15, 1996

[30] Foreign Application Priority Data

Oct. 20, 1995 [FR] France .................................. 95 12605

[51] Int. Cl.⁶ ....................................................... G02G 7/02
[52] U.S. Cl. ............................ 351/159; 351/177; 351/178
[58] Field of Search ..................................... 351/159, 166, 351/172, 178, 177

[56] References Cited

U.S. PATENT DOCUMENTS

| | | |
|---|---|---|
| 1,741,536 | 12/1929 | Rayton . |
| 4,656,590 | 4/1987 | Ace ......................................... 351/177 |
| 4,781,452 | 11/1988 | Ac ........................................... 351/177 |
| 4,969,729 | 11/1990 | Merle ....................................... 351/168 |
| 5,648,832 | 7/1997 | Houston et al. . |
| 5,689,323 | 11/1997 | Houston et al. . |

FOREIGN PATENT DOCUMENTS

| | | |
|---|---|---|
| 0094629 | 11/1983 | European Pat. Off. . |
| 2626086 | 7/1989 | France . |
| 2689654 | 10/1993 | France . |
| 38 17 850 A1 | 12/1989 | Germany . |
| 94/21448 | 9/1994 | WIPO . |

*Primary Examiner*—Frank G. Font
*Assistant Examiner*—Jason D. Vierra-Eisenberg
*Attorney, Agent, or Firm*—Oliff & Berridge, PLC

[57] ABSTRACT

The present invention concerns an optically non correcting lens blank for the manufacture of an optically non correcting lens, having a high curvature, corresponding to an average radius of curvature at most equal to about 90 mm, said lens blank comprising a transparent blade, and having on the one hand, a geometrical axis, passing through said blade and defining a geometrical center, and on the other hand, an optical axis defining an optical center, the blade, when seen in elevation, further having a generally non circular contour, the optical axis and geometrical axis, and thus the optical and geometrical centers, being physically separated by a predetermined distance from each other and angularly displaced, the blade further comprising stacking correction means, which are integrated with or affixed to the contour of the blank.

34 Claims, 3 Drawing Sheets

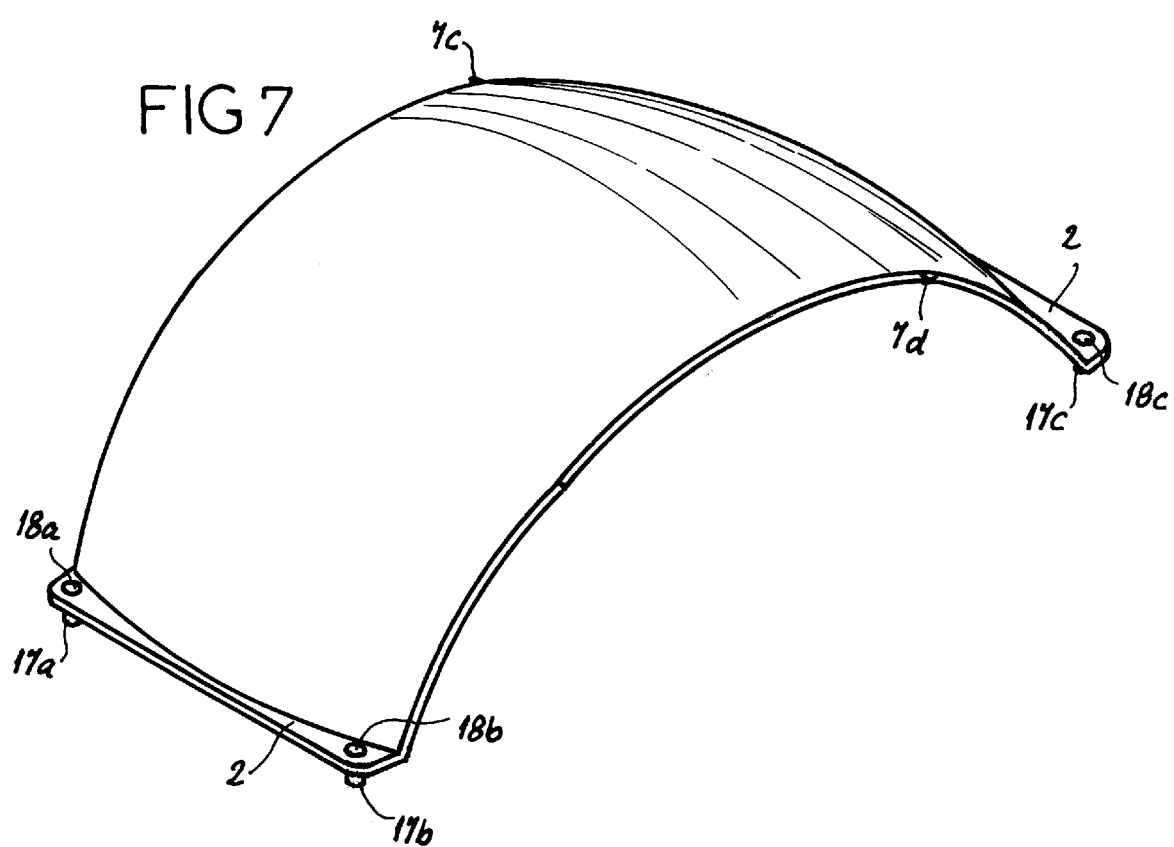

LENS BLANKS, PROCESS OF MANUFACTURE THEREFOR AND EYEWEAR INCORPORATING LENSES MADE THEREFROM

DEFINITION OF TERMS

The following definitions are given hereunder for certain terms used in the description, as follows:

"optically non correcting" means that the lens blank and lenses according to the present invention do not have any, or are substantially free of any optical or dioptric power;

"high curvature" means that generally, the average radius of curvature of the lens blanks, and consequently the lenses made therefrom, is at the most equal to about 90 mm.

FIELD OF THE INVENTION

The present invention relates to optically non correcting lens blanks for the manufacture of optically non correcting lenses, the shape of which is to be adapted to a given lens frame. In particular, the optically non correcting lens blanks and optically non correcting lenses which are made therefrom are intended to be used in sunglasses and in protective eyewear for industry, sport, and leisure activities.

The invention will be more clearly discussed with reference to a preferred non limiting embodiment of a spherical eccentric lens blank, having an internal concave face and external convex face.

Generally, existing lens blanks are manufactured from a spherically shaped member, so as to have a blade-like shape, and when viewed in elevation, have a circular contour of about 75 mm average diameter, and possibly even 85 mm. The optical and geometrical axes pass through the same point on the blank's surface, i.e. at the geometrical centre of the blank, said axis being at the same time an axis of rotational symmetry of the blade. The laws of optics which are used for the definition of such blanks are known as such and the actual state of the prior art enables a person to calculate the values of the internal and external radii, which results in a product whose optical properties, i.e. power, astigmatism, and prism satisfy the current standards applied for lenses of the type described above. These standards are applicable to both the mounted lens and the glasses or goggles comprising such mounted lenses, the latter having to take into account the difference between the prismatic effect of the right and left lens.

However, presently available lenses for sunglasses or protective eyewear do not allow the spectacles manufacturer to freely define the shape of his lens to correspond to a given frame, and at the same time meet the standards currently in force. In particular, the blanks currently available do not enable the manufacturer to obtain spectacles or eyewear in which the optical axis is substantially parallel to the horizontal axis of symmetry, or line of sight of the eye, of the eyewear when worn, especially when the lens has a very high curvature, i.e. corresponding to an average radius of curvature at the most equal to about 90 mm. Indeed, if the parallelism is not substantially maintained, the wearer of the eyewear often suffers from physiological disturbances, such as for example, tired eyes, headaches, or even problems with appreciating distances. These problems are exacerbated by the fact that the geometry of contemporary frames tends to project the shape of the lens towards the temporal zone, in order to better protect the eye from lateral rays and projections of light.

In order to solve this problem, it would in theory be possible to provide spherical lens blanks having a particular circular circumferential shape, when seen in elevation, and having an increased diameter, i.e. greater than the usual 70 mm or 85 mm, for example about 120 mm. However, this solution is not possible with the manufacturing equipment currently available, because it would imply building new machines, thereby excessively increasing manufacturing costs. Furthermore, the use of lens blank of such a diameter also implies an increase in the quantity of material necessary for manufacture of the blank itself, and consequently further increase in production costs.

BACKGROUND ART

In U.S. Pat. No. 1,741,536, to Rayton, it is known to provide spherical or cylindrical lenses for goggles or sunglasses in which the optical axis is substantially parallel to the direct line of sight of the eye, in order to eliminate, at the line of sight, the difficulties of apparent displacement of viewed objects, due to prismatic effects.

Thus, it was known to use eccentric lenses of high curvature to overcome prismatic problems in eyewear such as sunglasses.

However, a problem associated with the use of such lenses is that the spectacles or eyewear manufacturer has to ensure that the eccentric blank is positioned correctly in the cutting machine, so that when the cut lens is mounted in a spectacles frame, the optical axis is indeed parallel to the line of sight of the eye. This necessity results from the non coincidence of the optical and geometrical axes of such lens blanks, as illustrated in the Figures of the '536 patent to Rayton. Failure to ensure correct positioning of the blank results in a lens which will not avoid the problems of prismatic effects, because the optical axis of the lens will not be substantially parallel to the line of sight. This problem is particularly important with non correcting lens blanks of high curvature, such as those described by Rayton in his '536 patent, due to the impossibility of stacking the blanks vertically and stably for introduction into a cutting machine.

BRIEF DESCRIPTION OF THE INVENTION

It therefore is an object of the present invention to overcome the difficulties associated with the use of lens blanks and lenses of the type described in the '536 patent to Rayton, by providing a lens blank with stacking correction means enabling substantially stable and vertical stacking of the lens blanks. This enables the lens blanks to be used in traditional cutting equipment, and in the knowledge that the blank will always be properly positioned for introduction into the cutting machine with respect to optical axis.

It is a further object to provide a process for the manufacture of a non correcting lens blank as described above.

Another object of the invention is non correcting eyewear, for example, spectacles, comprising a frame, and two non correcting lenses mounted therein, wherein the two lenses are obtained by cutting out from a lens blank made according to an embodiment of the invention, and wherein each lens has an optical axis substantially parallel to the axis of horizontal symmetry of the eyewear when worn, and preferably the optical centers are located at a distance which is smaller or larger than the average interpupillary distance.

The applicant of the instant invention has furthermore discovered that the use of high curvature, non correcting lens blanks, having displaced and non coincidental optical and geometrical axes, also enables freer definition of the shape of the lens to be made by the spectacles or protective eyewear manufacturer of a lens, as well as more freedom in the construction of the frames themselves, since it is possible to extend the frame and lens back from in front of the eye well into the temporal zone.

DESCRIPTION OF THE FIGURES

The invention will be better understood with reference to the following non limiting description of a non correcting lens blank according to the invention, and figures in which:

FIG. 7 represents an elevated perspective view of another preferred embodiment of a lens blank according to the present invention.

DETAILED DESCRIPTION OF THE INVENTION

Figure 1:
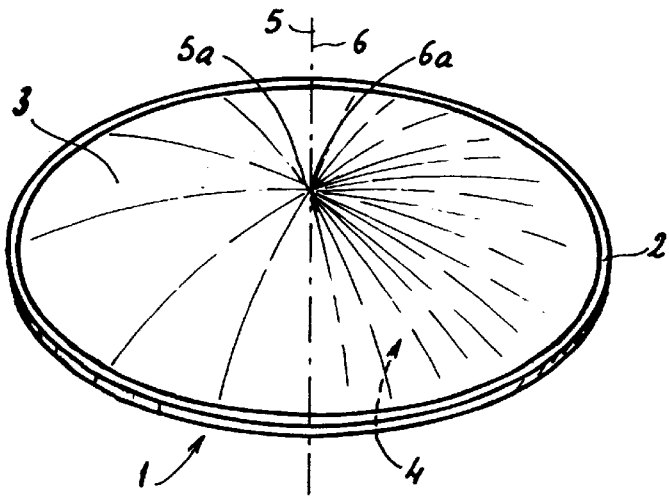
FIG. 1 represents a perspective view of a traditional spherical circular lens blank.

In accordance with the present invention, there is in an embodiment provided an optically non correcting lens blank for the manufacture of an optically non correcting lens, having a high curvature, corresponding to an average radius of curvature at most equal to about 90 mm, said lens blank comprising a transparent blade, and having on the one hand, a geometrical axis, passing through said blade and defining a geometrical center, and on the other hand, an optical axis defining an optical center, the blade, when seen in elevation, further having a generally non circular contour, the optical axis and geometrical axis, and thus the optical and geometrical centers, being physically separated by a predetermined distance from each other and angularly displaced, the blade further comprising stacking correction means, which are integrated with or affixed to the contour of the blade.

The blank according to the present invention comprises a blade having high curvature, and preferably a curvature corresponding to an average radius of curvature from between about 90 mm and about 43 mm. Above an average radius of curvature of about 90 mm, the blank is no longer considered to be of high curvature, and below the lower limit of 43 mm, the blank has a curvature which is too great to be used for the manufacture of non correcting lenses.

The blade, when seen in elevation, has a generally non-circular contour. As a consequence of this, the contour of the blade can be anything but circular, and may even be asymmetrical, for example generally trapezoid or parallelepiped, as defined at least partly, for example, by the intersection of the blade with two parallel planes. Preferably, the blade has a band shape, whose contour is defined at least partly by the intersection of the blade with two parallel planes. Even more preferably, the blade has a rotationally asymmetrical contour with respect to the optical axis of the blade.

Generally, the blank of the present invention has a thickness which varies as a function of the distance separating a given point and the optical center. This means that the greater the distance from the optical center of the blank, the thinner the blank becomes.

The stacking correction means in one preferred embodiment are preferably comprised by a delimiting flange, whose symmetrical axis is identical to the geometrical axis of the blank, and whose thickness, when measured along the geometrical axis of the blank, is at least equal to the greatest thickness of the latter about its contour. This allows several blanks to be stacked up substantially vertically and stably.

In another preferred embodiment, the stacking means comprise feet, integrally moulded with or affixed to the contour of the blade, and projecting downwards from a concave face thereof.

According to another preferred embodiment of the present invention, the blank comprises marker points which enable the determination of the zone comprising the optical center, and which are more preferably distributed on the contour of the blank.

The blank may consist of any suitable material, but is preferably vitreous, for example mineral or organic glass. More preferably, the blank is substantially made from polycarbonate glass.

The blank can be manufactured from a mold of any shape, for example substantially spherical, cylindrical, conical, frustoconical, or toric. Preferably however, the blank is made from a mold that is substantially spherical or cylindrical in shape.

According to another aspect of the present invention, the blanks are used to manufacture, for example by cutting out, non correcting lenses having the previously mentioned characteristics. When two of these non correcting lenses are mounted in a frame, the optical axis of each lens is substantially parallel to the horizontal axis of symmetry, or line of sight of the eye of the eyewear when worn by the wearer. Respecting the aforementioned conditions of parallelism with high curvature lenses obtained from standard lens blanks is not possible. Furthermore, and preferably, the optical center of each lens is located at a distance which is different from the average interpupillary distance of the wearer, thereby reducing any undesired prismatic effects to a minimum, and possibly even excluding them altogether.

In another preferred embodiment of this aspect of the invention, the angular separation between the optical axis of the lens, and the axis of horizontal symmetry, when mounted and worn, is comprised from between about 0° and about 15°.

DESCRIPTION OF PREFERRED EMBODIMENTS

FIG. 1 represents a traditional lens blank of high radius of curvature, comprising a blade bearing the general reference number 1, and known for use in the manufacture of optically non correcting lenses, for example for the manufacture of sunglasses. The blade 1, when seen in elevation, has a circular contour 2, and is made from a mold of transparent vitreous material that is substantially spherical or cylindrical in shape, for example comprising polycarbonate. The blade 1 has an external convex face 3, and an internal concave face 4, of average radius of about 65 mm. The circular spherical blank 1 also has an average diameter of about 75 mm, and an optical axis, shown by the dashed line, which passes through the blade 1. This optical axis coincides with the geometrical axis 6 of the blade 1. When a lens made from such a blank is mounted in a lens frame, the resulting optical axis is not parallel to the axis of horizontal symmetry, when worn.

Figure 2:
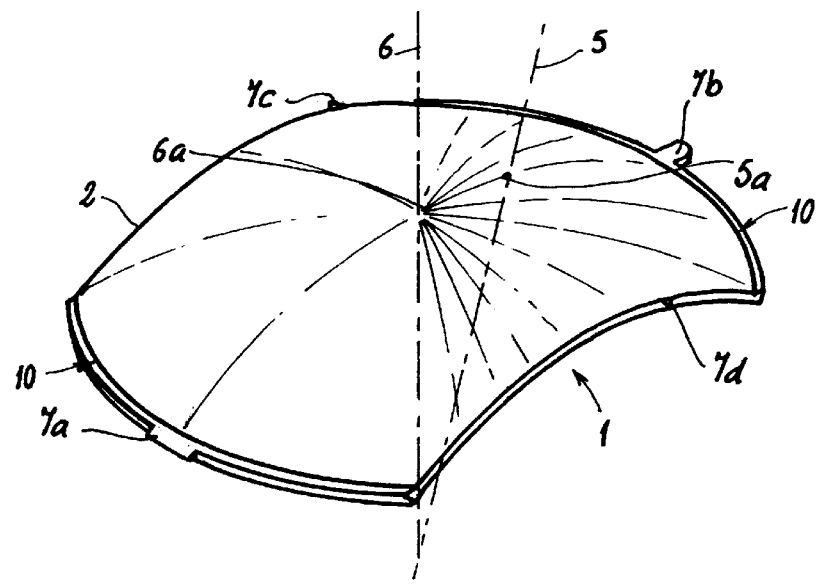
FIG. 2 represents a perspective view of a lens blank according to the present invention.

According to the presently preferred embodiment of the invention, as shown by FIGS. 2 to 6, a lens blank is provided, having high curvature, comprising a blade 1 which, when seen in elevation, has a non circular generally parallelepiped contour 2, and which takes the shape of a curved band, the contour 2 being defined in part by the intersection of the blade 1 with two parallel planes. The blank can be made from a spherical or cylindrical mold filled with vitreous material (not shown), such as polycarbonate, and has a geometrical axis 6, which passes through the blade 1, defining a geometrical center 6a, and an optical axis 5, defining an optical center 5a. The optical axis 5 and the geometrical axis 6, and consequently the optical and geometrical centers, are separated and angularly displaced one from the other. The blade 1, as shown by FIG. 2, has a rotationally asymmetrical contour 2 with respect to the optical axis 5.

Figure 3:
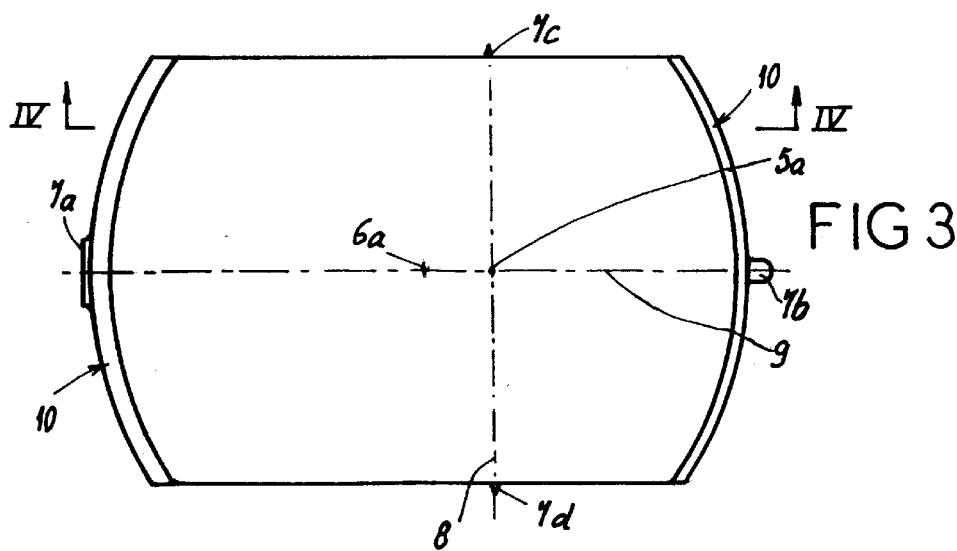
FIG. 3 represents a plan view of the blank of FIG. 2.

FIG. 3 is a plan view of the blank shown in FIG. 2, showing more clearly that the blade 1 is further provided with marker points 7a, 7b, and optionally 7c, and 7d, in the shape of projections or notches respectively, distributed about the contour 2, which allow the eyewear manufacturer to locate a zone on the blank comprising the optical center 5a, by tracing an imaginary line 9 on the surface of the blade 1, from the marker point 7c to marker point 7d. The intersection of line 9 with an imaginary line 8 drawn from marker points 7a and 7b, provides the zone comprising the optical center 5a, which thereby enables the eyewear manufacturer to position the shape of the lens to be cut out with respect to the blank.

Figure 4:
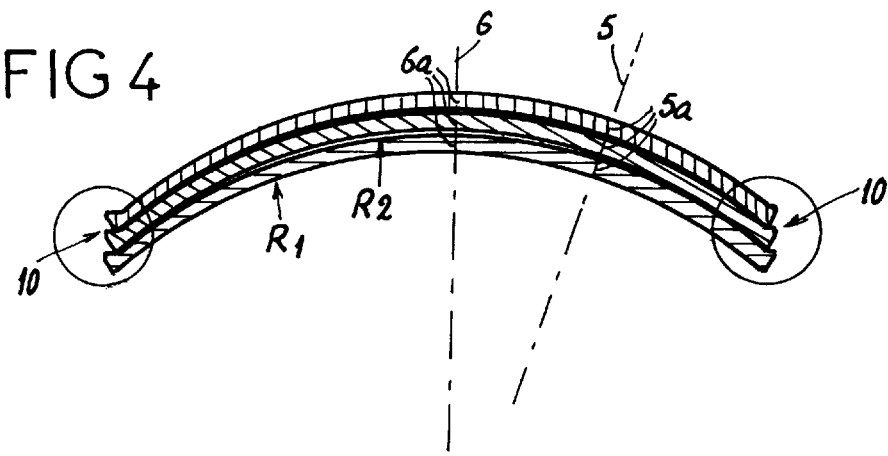
FIG. 4 represents a cross-sectional view, along the line IV—IV of FIG. 3, of a stack comprising several blanks according to the present invention.

FIG. 4 represents a cross sectional view, along the line IV—V of FIG. 3, of several blanks according to the invention stacked up. This figure also shows optical axis 5 and geometrical axis 6, optical and geometrical centers 5a and 6a, and the internal R1 and external R2 radii of the blank. In the preferred embodiment, R1 is equal to about 65 mm and R2 equal to about 66 mm, but the average radius can vary generally between about 43 mm and about 90 mm. Also shown in FIG. 4 is the variation of the thickness of the blade from one edge to another, the maximum thickness being located at the optical center 5a, as explained previously. This variation in thickness usually prevents a stable and substantially vertical stacking of the blanks, but is corrected according to the present invention by stacking correction means indicated generally by the reference 10, and shown magnified by FIGS. 5 et 6.

Figure 5:
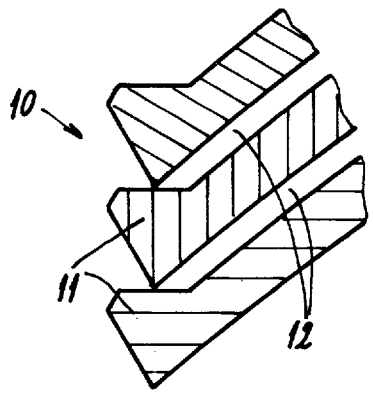
FIGS. 5 and 6 represent magnified cross-sectional views of the contour of the blank represented in FIG. 4.
Figure 6:
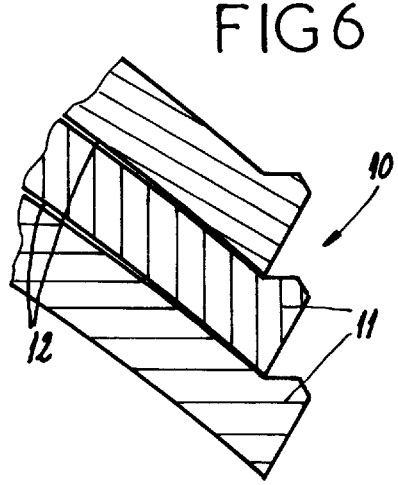

In FIGS. 5 and 6, stacking correction means 10 preferably, but non exclusively, comprise a delimiting flange 11, integrated with or affixed to the contour 2. In the preferred embodiment illustrated by FIGS. 2 to 6, the delimiting flange 11 is formed as an integral part of the contour 2 when the blank is moulded. The axis of symmetry of delimiting flange 11 is coincidental with the geometrical axis 6 of the blade 1, and its thickness, measured along the geometrical axis 6, is at least as great as the thickest part of the blade around its contour. In this way, each blank is separated from that stacked directly above or beneath it, by a cushion of air 12, whose thickness varies inversely to the thickness of the blade 1. Such a configuration enables substantially vertical and stable stacking of several blanks one on top of the other, without the risk that the blanks will be introduced into the cutting machine with the optical axis 5a out of position.

FIG. 7 shows a perspective elevated view of another preferred embodiment of the present invention. In this embodiment, the stacking protection means are provided by four feet, of which three only 17a, 17b, 17c are visible in the figure, integrally moulded with, or affixed to the contour 2 of the blade 1. The feet project in a generally downwards direction from the substantially concave face of the blade 1. On the upper or convex face of the blade 1, corresponding locating hollows 18a, 18b, 18c, have been provided on the contour 2 in order to provide a secure seating of the feet 17a, 17b, 17c of a further blade 1 to be stacked on top. Where necessary, the height of the feet can be adjusted to ensure that the blanks stack correctly and substantially vertically.

Figure 8:
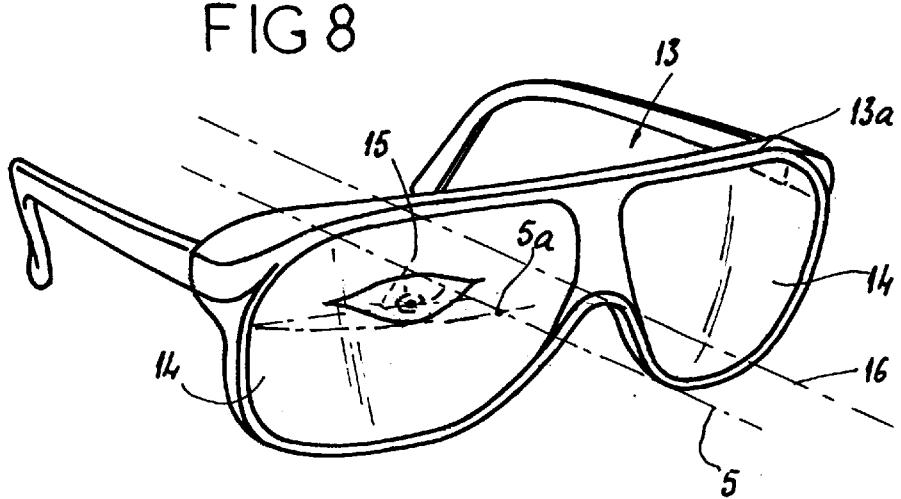
FIG. 8 represents a perspective view of eyewear comprising a frame comprising two lenses which have been cut out from a blank according to the present invention, and indicating the general positions of the different axes involved.

FIG. 8 represents schematically eyewear and more particularly a pair of spectacles, bearing the general reference 13, comprising a frame 13a, and two optically non correcting lenses 14, obtained by cutting them out from an optically non correcting lens blank according to the present invention. The relative position of the spectacles to an eye 15 of a wearer is also shown. The spectacles have an axis of horizontal symmetry 16, when worn, an optical axis 5 substantially parallel to axis 16. By using optically non correcting blanks according to the present invention, the parallelism between the axis of symmetry 16 and the optical axis may vary, between about 0° and about 15°, without any undesirable physiological effects being created.

It will be apparent to the skilled in the art that other variants and modifications of the present invention are possible without departing from the spirit and scope of the claims.

What is claimed is:

1. An optically non-correcting lens blank for the manufacture of an optically non-correcting lens, having a high curvature, corresponding to an average radius of curvature at most equal to about 90 mm, wherein the blank further comprises stacking correction means, which are integrated with or affixed to a contour of the blank.

2. Non-correcting lens blank according to claim 1, the lens blank being transparent and having a geometrical axis passing through the blank and defining a geometrical center, and also having an optical axis defining an optical center, the optical axis and geometrical axis, and thus the optical and geometrical centers, being physically separated by a predetermined distance from each other and angularly displaced, the blank, when seen in elevation, further having a generally non-circular contour.

3. Non-correcting lens blank according to claim 1, wherein the blank has a high curvature corresponding to an average radius of curvature between about 90 mm and about 43 mm.

4. Non-correcting lens blank according to claim 1, wherein the blank, when seen in elevation, has a rotationally asymmetrical contour with respect to an optical axis of the blank.

5. Non-correcting lens blank according to claim 1, wherein the contour is defined in part by an intersection of the blank with two parallel planes.

6. Non-correcting lens blank according to claim 1, wherein the blank is band-shaped.

7. Non-correcting lens blank according to claim 1, wherein the stacking correction means comprise a delimiting flange having an axis of symmetry coincidental with a geometrical axis of the blank, and having a thickness measured along the geometrical axis of the blank at least equal to a thickest part of the blank around its contour, the delimiting flange thereby enabling several lens blanks to be stacked substantially vertically and stably.

8. Non-correcting lens blank according to claim 1, wherein the stacking correction means comprise feet molded integrally with or affixed to the contour of the blank.

9. Non-correcting lens blank according to claim 1, wherein the feet project from a concave face of the blank.

10. Non-correcting lens blank according to claim 1, wherein the blank is comprised of vitreous material.

11. Non-correcting lens blank according to claim 1, wherein the blank is comprised of polycarbonate.

12. Non-correcting lens blank according to claim 1, wherein the blank further comprises marker points enabling location of a zone comprising an optical center of the blank.

13. Non-correcting lens blank according to claim 12, wherein the marker points are distributed around the contour.

14. Process for the manufacture of an optically non-correcting lens blank according to claim 1, wherein the blank is molded from a mold with a starting material, and wherein the mold is chosen from the group consisting of spherical molds, cylindrical molds, conical molds and toric molds.

15. Process according to claim 14, wherein the blank is injection molded.

16. An optically non-correcting lens blank for the manufacture of an optically non-correcting lens, having a high curvature, corresponding to an average radius of curvature at most equal to about 90 mm, the lens blank being transparent and having a geometrical axis passing through the blank and defining a geometrical center, and also having an optical axis defining an optical center, the optical axis and geometrical axis, and thus the optical and geometrical centers, being physically separated by a predetermined distance from each other and angularly displaced, the blank, when seen in elevation, further having a generally non-circular contour.

17. Non-correcting lens blank according to claim 16, wherein the contour is defined in part by an intersection of the blank with two parallel planes.

18. Non-correcting lens blank according to claim 16, wherein the blank is band-shaped.

19. Non-correcting lens blank according to claim 16, wherein the blank further comprises stacking correction means comprising a delimiting flange having an axis of symmetry coincidental with the geometrical axis of the blank, and having a thickness measured along the geometrical axis of the blank at least equal to a thickest part of the blank around its contour, the delimiting flange thereby enabling several lens blanks to be stacked substantially vertically and stably.

20. Non-correcting lens blank according to claim 16, wherein the blank further comprises stacking correction means comprising feet molded integrally with or affixed to the contour of the blank.

21. Non-correcting lens blank according to claim 16, wherein the blank is comprised of vitreous material.

22. Non-correcting lens blank according to claim 16, wherein the blank is comprised of polycarbonate.

23. Non-correcting lens blank according to claim 16, wherein the blank further comprises marker points enabling location of a zone comprising the optical center of the blank.

24. Non-correcting lens blank according to claim 23, wherein the marker points are distributed around the contour.

25. Process for the manufacture of an optically non-correcting lens blank according to claim 16, wherein the blank is molded from a mold with a starting material, and wherein the mold is chosen from the group consisting of spherical molds, cylindrical molds, conical molds and toric molds.

26. Process according to claim 25, wherein the blank is injection molded.

27. An optically non-correcting lens blank for the manufacture of an optically non-correcting lens, having a high curvature, corresponding to an average radius of curvature at most equal to about 90 mm, the lens blank being transparent and having a geometrical axis passing through the blank and defining a geometrical center, and also having an optical axis defining an optical center, the optical axis and geometrical axis, and thus the optical and geometrical centers, being physically separated by a predetermined distance from each other and angularly displaced, wherein the blank further comprises marker points enabling location of a zone comprising the optical center of the blank.

28. Non-correcting lens blank according to claim 27, wherein the marker points are distributed around a contour of the blank.

29. Non-correcting lens blank according to claim 27, wherein the blank has a high curvature corresponding to an average radius of curvature between about 90 mm and about 43 mm.

30. Non-correcting lens blank according to claim 27, wherein the blank, when seen in elevation, has a rotationally asymmetrical contour with respect to the optical axis of the blank.

31. Non-correcting lens blank according to claim 27, wherein a contour of the blank is defined in part by an intersection of the blank with two parallel planes.

32. Non-correcting lens blank according to claim 27, wherein the blank further comprises stacking correction means comprising a delimiting flange having an axis of symmetry coincidental with the geometrical axis of the blank, and having a thickness measured along the geometrical axis of the blank at least equal to a thickest part of the blank around its contour, the delimiting flange thereby enabling several lens blanks to be stacked substantially vertically and stably.

33. Non-correcting lens blank according to claim 27, wherein the blank further comprises stacking correction means comprising feet, molded integrally with or affixed to the contour of the blank, and projecting from a concave face thereof.

34. Process for the manufacture of an optically non-correcting lens blank according to claim 27, wherein the blank is molded from a mold with a starting material, and wherein the mold is chosen from the group consisting of spherical molds, cylindrical molds, conical molds and toric molds.

* * * * *